(12) United States Patent
Totten et al.

(10) Patent No.: US 10,021,822 B2
(45) Date of Patent: Jul. 17, 2018

(54) MOUNTED IMPLEMENT WEIGHT TRANSFER

(71) Applicant: CNH Industrial America LLC, New Holland, PA (US)

(72) Inventors: Nathaniel Kip Totten, Lititz, PA (US); Cale N. Boriack, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/788,318

(22) Filed: Jun. 30, 2015

(65) Prior Publication Data

US 2017/0000005 A1   Jan. 5, 2017

(51) Int. Cl.
- *A01B 63/14* (2006.01)
- *A01B 63/22* (2006.01)
- *A01C 7/20* (2006.01)

(52) U.S. Cl.
CPC ............ *A01B 63/22* (2013.01); *A01B 63/145* (2013.01); *A01C 7/203* (2013.01); *A01C 7/205* (2013.01)

(58) Field of Classification Search
CPC .. A01C 7/08; A01C 7/06; A01C 7/203; A01C 7/205; A01C 7/208; A01L 363/22; A01B 63/22; A01B 59/042; A01B 63/145
See application file for complete search history.

(56) References Cited

U.S. PATENT DOCUMENTS

| | | | |
|---|---|---|---|
| 4,377,979 A | 3/1983 | Peterson et al. | |
| 4,492,272 A | 1/1985 | Jensen | |
| 4,496,004 A | 1/1985 | Frase et al. | |
| 5,161,622 A | 11/1992 | Godbersen | |
| 5,687,798 A | 11/1997 | Henry et al. | |
| 5,809,914 A | 9/1998 | Follmer | |
| 6,044,916 A * | 4/2000 | Hundeby | A01B 63/145 172/448 |
| 6,189,465 B1 | 2/2001 | Burns et al. | |
| 6,220,366 B1 | 4/2001 | Noonan et al. | |
| 6,371,216 B1 | 4/2002 | Friggstad | |
| 6,401,832 B1 | 6/2002 | Payne et al. | |

(Continued)

FOREIGN PATENT DOCUMENTS

EP   1 862 052 A1   12/2007

OTHER PUBLICATIONS

"Spartan 607 Pneumatik-Drill", Great Plains Ag, May 15, 2015 (3 pages).

*Primary Examiner* — Robert E Pezzuto
*Assistant Examiner* — Adam J Behrens
(74) *Attorney, Agent, or Firm* — Rebecca L. Henkel; Rickard K. DeMille

(57) ABSTRACT

A seed planting apparatus includes a toolbar mounted on a tractor for traversing the ground in a direction perpendicular to the longitudinal axis of the toolbar. A plurality of seeding units are spaced laterally across the toolbar for ground penetration and planting of seeds. A ground engaging wheel is provided and a linkage connects the wheel to the toolbar for up and down movement relative to the ground. An actuator interconnects the toolbar to at least one of the linkage and wheel for selectively elevating the wheel. A bulk seed hopper is supported adjacent the wheel and a control system determines a parameter associated with the toolbar and raises and lowers the wheel to transfer weight from the bulk feed hopper to and from the toolbar.

16 Claims, 2 Drawing Sheets

(56) References Cited

U.S. PATENT DOCUMENTS

| | | | |
|---|---|---|---|
| 6,679,339 B1 | 1/2004 | Steinlage et al. | |
| 7,997,217 B2* | 8/2011 | Stark | A01C 7/203 |
| | | | 111/151 |
| 8,006,775 B2 | 8/2011 | Steinlage et al. | |
| 8,141,652 B2 | 3/2012 | Poole et al. | |
| 8,186,449 B2 | 5/2012 | Hackert et al. | |
| 8,342,256 B2 | 1/2013 | Adams et al. | |
| 8,434,593 B2 | 5/2013 | Remoué | |
| 8,469,114 B1 | 6/2013 | Borkgren | |
| 8,505,645 B1 | 8/2013 | Kelly et al. | |
| 8,517,118 B2* | 8/2013 | Remoue | A01B 63/22 |
| | | | 172/311 |
| 8,567,517 B2 | 10/2013 | Friggstad et al. | |
| 8,636,078 B2 | 1/2014 | Yuen | |
| 8,763,716 B2 | 7/2014 | Rosenboom | |
| 8,903,545 B2* | 12/2014 | Riffel | A01C 15/006 |
| | | | 700/240 |
| 9,510,499 B2* | 12/2016 | Tuttle | A01B 63/22 |
| 2010/0192820 A1* | 8/2010 | Stark | A01B 63/22 |
| | | | 111/69 |
| 2014/0000919 A1 | 1/2014 | Bachman et al. | |
| 2014/0096983 A1* | 4/2014 | Blackwell | A01C 7/08 |
| | | | 172/1 |
| 2014/0379230 A1 | 12/2014 | Koch et al. | |
| 2015/0000942 A1* | 1/2015 | Tuttle | A01B 63/22 |
| | | | 172/2 |
| 2015/0013579 A1* | 1/2015 | Mariman | A01B 76/00 |
| | | | 111/59 |

\* cited by examiner

MOUNTED IMPLEMENT WEIGHT TRANSFER

BACKGROUND OF THE INVENTION

1. Field of the Invention

The present invention relates to farm implements, and, more particularly, to weight transfer within said farm implements.

2. Description of the Related Art

One of the more commonly used implements in the farm equipment field is a planter implement. Farmers utilize a wide variety of seed planting implements including seed drills and planters. In a known type of planting implement, seed planting or row units are attached to a toolbar extending transverse to the direction of planting. The toolbar is coupled to a tractor or other work vehicle suitable for front pulling the planting implement along a field that is to be seeded with a crop. Each seed planting unit includes a ground penetrating assembly, often including one or more disks, for opening a seed trench or furrow in the ground as the planting implement is pulled across a field. Components of the ground penetrating assembly shape the bottom and sides of the seed trench and a seed metering device provides individual seeds at a controlled rate for deposit in a seed trench. Furrow closing components of each row unit close the seed trench in a controlled manner.

As the need for more efficient farming operations becomes more evident, the speed of planting increases to achieve greater output for a given period of time. While this enhances productivity in the farming operation, it presents a problem in that with variable soil content (for example ranging from clay soil to sandy soil), the reaction force from the ground penetrating components to the toolbar varies greatly. As a result, during certain conditions the ground penetrating components of the seeding assembly can cause the toolbar to be elevated, thus resulting in the seeds being planted at less than an optimal depth.

In the past, it has been a practice to transfer loads from one part of the frame to another in an attempt to balance the forces on the toolbar, usually transferring weight from the center section to the wings. While this has had limited success, it is not capable of adding or taking away of weight from the entire toolbar, it only shifts weight from one section to another.

Accordingly, what is needed in the art is an apparatus and method for providing superior load transfer to the toolbar of a farm implement.

SUMMARY OF THE INVENTION

The present invention attempts to achieve a uniform force on the toolbar by dynamically transferring component weights to and from the toolbar.

The present invention also achieves these ends in an efficient and simplified manner.

In one form, the present invention is a farm implement having a toolbar mounted for traversing the ground in a direction perpendicular to the longitudinal axis of the toolbar. Ground engaging tools are supported by the toolbar and provide a force to the toolbar. At least one ground engaging support is connected by a linkage to the toolbar for up and down movement relative to the ground. A component having a weight is supported adjacent the ground engaging support. An actuator interconnects the toolbar and at least one of the linkage and ground engaging support for selectively elevating the ground engaging support relative to the ground. A control system determines a parameter associated with the toolbar and raises and lowers the ground engaging support to transfer one of force and weight from the component to and from the toolbar.

In another form, the invention is a seed planting apparatus including a toolbar mounted on a tractor for traversing the ground in a direction perpendicular to the longitudinal axis of the toolbar. A plurality of seeding units are spaced laterally across the toolbar for ground penetration and planting of seeds. A ground engaging support is provided and a linkage connects the ground engaging support to the toolbar for up and down movement relative to the ground. An actuator interconnects the toolbar to at least one of the linkage and ground engaging support for selectively elevating the ground engaging support. A component having weight is supported adjacent the ground engaging support and a control system determines a parameter associated with the toolbar and raises and lowers the ground engaging support to transfer weight from the component having weight to and from the toolbar.

In still another form, the invention is a method for balancing weights in a farm implement having a toolbar carrying ground engaging tools along a field and having a weight component. The method involves the steps of supporting the weight component adjacent a ground engaging support through articulated joints to the toolbar and raising and lowering the ground support and component relative to the ground to transfer weight to and from the toolbar during field operation.

The present invention offers the advantage of a dynamic weight transfer to and from a toolbar of a farm implement to maintain proper pressure and/or elevation relative to the ground.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
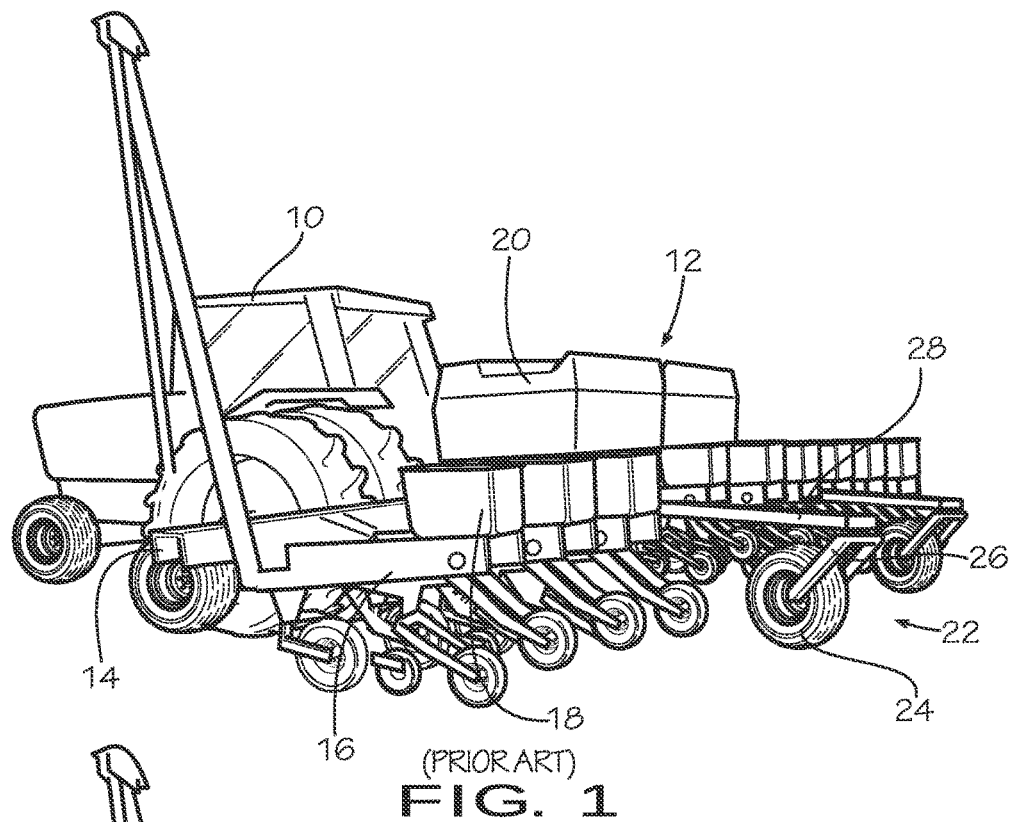
FIG. 1 shows a prior art farm implement having a plurality of seeding components.

Referring now to FIG. 1, there is shown an agricultural implement for planting, including a tractor 10 that pulls a planter unit 12 through the fields. A toolbar 14 is supported laterally on the planter unit so that the direction of travel through the field is perpendicular to the longitudinal axis of the toolbar 14. Toolbar 14 is supported above the ground by ground support wheels (not shown) forward or rearward of its position. The toolbar 14 provides support for a plurality of laterally and uniformly spaced seeding assemblies 16. The seeding assemblies 16 have ground penetrating elements, a trench forming section, seed application section and closing section to provide seeds at predetermined locations at a given depth. Details of the seeding assemblies 16 are not shown to enable a better focus on the present invention.

The individual seeding assemblies 16 have mini hoppers 18 that are in turn fed by bulk seed hoppers 20 mounted over the toolbar 14 and forward of the mini hoppers 18. Frame members 28 extend rearward from the toolbar 14 and have a castering support 26 for ground support wheels 24. Thus, the castered ground support wheels 24 provide aft support for the toolbar 14 to maintain it at a given level. When the planter unit 12 is pulled through a field and over the ground, the trench opening and forming elements cause an opposite reaction on the toolbar 14. As the speed of planting operation is increased, the forces that act on the toolbar 14 vary dynamically. Depending upon the nature and consistency of the soil, a reaction force on the toolbar 14 can cause it to be elevated, thus causing the seeding assemblies 16 to be planting seeds not at the level intended by the mechanism.

Figure 2:
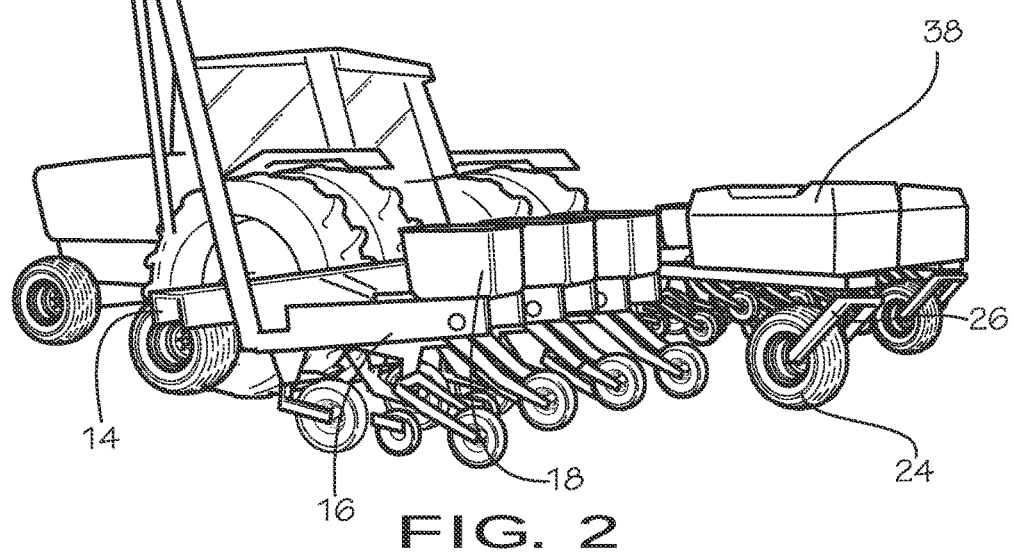
FIG. 2 is the farm implement of FIG. 1 with components embodying the present invention; and, FIG. 3 is a side view of a detail of the farm implement of FIG. 2.
Figure 3:
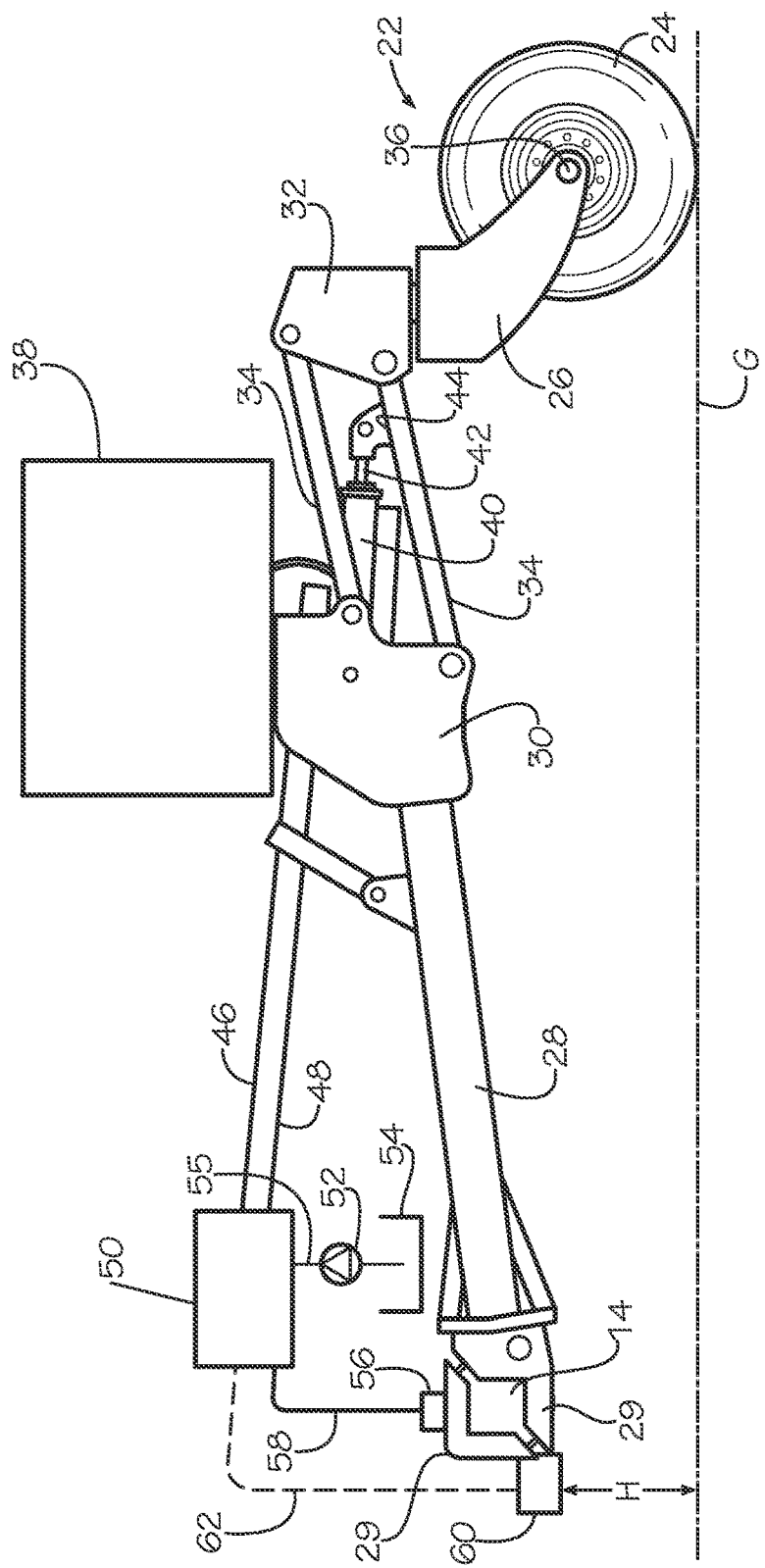

In accordance with the present invention, the system shown in FIGS. 2 and 3 provides consistent force control on toolbar 14. Referring first to FIG. 2, a component 38 having weight is supported aft of the toolbar 14 and adjacent the ground support wheel 24, as shown in FIG. 3. The weight component 38 may be but not limited to a bulk fill seed hopper, a bulk fill fertilizer hopper, concrete weights, or gravel. Specifically referring to FIG. 3, the frame arm 28 is supported by toolbar 14 and extends aft to a forward knuckle 30. The frame 28 is connected to toolbar 14 by clamp assemblies 29 enabling ready removal. A rearward knuckle 32 provides a structural support for the castering frame 26 that includes an axle 36 for ground support wheel 24. Parallel links 34 interconnect forward knuckle 30 and rearward knuckle 32 so as to provide uniform up and down movement. The weight component 38 is structurally connected to knuckle 30 and frame 28 adjacent ground support wheel 24 so that its weight is carried through these elements. As herein shown, the component 38 acts through frame 28 and knuckle 30. It should be apparent to those skilled in the art, however, that the component 38 could be mounted on rearward knuckle 32 and still provide benefits according to the present invention as will be described below. In addition, the parallel links 34 may be in any one of a number of linkage types.

An actuator including an actuator cylinder 40 and an actuator rod 42 is connected to forward knuckle 30 by a connection (not shown) and to parallel link 34 by an actuator rod connector 44. Thus, extension and retraction of actuator rod 42 causes the ground wheel 24 to be elevated or lowered relative to the ground G. Actuator cylinder 40 receives hydraulic fluid inputs through line 46 for the piston end and line 48 for the rod end. Lines 46 and 48 receive appropriate pressure inputs from a hydraulic controller 50 receiving pressurized hydraulic fluid from pump 52 supplied by a reservoir 54 through a line 55. The hydraulic components may be mounted on tractor 10. Hydraulic controller 50 receives inputs to actuate cylinder 40 in response to a number of parameters, one of which is force on the toolbar 14 through a force sensor 56 supplying a signal to hydraulic controller 50 through line 58. Hydraulic controller 50 receives inputs from force sensor 56 to raise or lower ground wheel 24 and thus transfer to or from the toolbar 14 the weight of component 38. By using the force sensor 56, the forces are balanced so that as the planting unit 12 traverses the ground, variations in soil consistency are accommodated and the actuator raises wheels 24 to increase the down force on toolbar 14.

An alternative signal input is found by a sensor 60 that senses the height H above the ground G and feeds the signal to the hydraulic controller 53 through a line 62.

The control system for the hydraulic actuator can be closed loop as shown in FIG. 3 but also may be open loop and still provide benefits of the present invention. The actuator is shown as hydraulic but may be in other forms such as pneumatic or electrical and still provide the appropriate level of force control. While the component 38 is shown as the weight whose mass is transferred to the toolbar 14, it should be noted that the weight may be provided by other components such as concrete weights or other items of predetermined mass so that appropriate downforce may be applied to the toolbar 14.

In operation, as the planting unit 12 traverses the ground, the reaction forces on the toolbar 14 may be such that they act in a direction to elevate it, thus altering the desired seed level achieved by the planting units. By elevating the ground support wheel 24, the weight of the component 38 or other mass is then applied as a force to the toolbar 14 to counteract the reaction force of the soil consistency.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A farm implement comprising:
a toolbar mounted for traversing the ground in a direction perpendicular to the longitudinal axis of said toolbar;
ground engaging tools supported by said toolbar and providing a force to said toolbar;
at least one ground engaging support;
a linkage connecting said ground engaging support to said toolbar for up and down movement relative to the ground;
a component having a weight supported adjacent said ground engaging support, wherein the component is arranged relative to the toolbar such that the component is configured to be elevated or lowered relative to the toolbar;
an actuator interconnecting said toolbar and at least one of said linkage and ground engaging support, wherein said actuator is configured to elevate or lower the component relative to said toolbar by elevating or lowering said ground engaging support;
at least one sensor configured to determine at least one of a height, force and weight transfer to said toolbar; and,
a control system configured to actuate, responsive to signals from said at least one sensor, said actuator to elevate and lower said component relative to said toolbar by elevating or lowering the ground engaging support to transfer one of force and weight between said toolbar and said component as the vehicle travels over varying terrain.

2. The farm implement as claimed in claim 1, wherein said ground support is at least one wheel.

3. The farm implement as claimed in claim 1, wherein said component is at least one bulk tank.

4. The farm implement as claimed in claim 1, wherein said component has a predetermined mass.

5. The farm implement as claimed in claim 3, wherein said implement is a planter and at least one of said bulk tanks contain at least one of seeds, chemical and fertilizer.

6. The farm implement as claimed in claim 1, wherein said at least one sensor measures force on said tool bar and provides a signal to said control system.

7. The farm implement as claimed in claim 1, wherein said at least one sensor measures distance of the toolbar from the ground and provides a signal to said control system.

8. The farm implement as claimed in claim 1, wherein said at least one sensor measures weight transfer to said toolbar and provides a signal to said control system.

9. A planter assembly comprising:
 a toolbar mounted for traversing the ground in a direction perpendicular to the longitudinal axis of said toolbar;
 a plurality of seeding assemblies mounted on said tool bar and spaced laterally relative to the direction of travel of a tractor;
 at least one ground engaging support for said toolbar;
 a linkage connecting said ground engaging support to said toolbar for up and down movement relative to the ground;
 a component having a weight supported adjacent said ground engaging support, wherein the component is arranged relative to the toolbar such that the component is configured to be elevated or lowered relative to the toolbar;
 an actuator connecting said tool bar to at least one of said linkage and ground engaging support, wherein said actuator is configured to elevate or lower the component relative to said toolbar by elevating said ground engaging support; and,
 a control system configured to actuate said actuator to elevate and lower said component relative to said toolbar by elevating or lowering the ground engaging support to transfer at least one of force and weight between said toolbar and said component as the vehicle travels over varying terrain, wherein said control system comprises at least one sensor configured to determine at least one of a height, force and weight transfer to said toolbar.

10. The planter assembly as claimed in claim 9, wherein said ground support is at least one wheel.

11. The planter assembly as claimed in claim 9, wherein said component is at least one bulk tank.

12. The planter assembly as claimed in claim 9, wherein said component has a predetermined mass.

13. The planter assembly as claimed in claim 11, wherein at least one of said bulk tanks contain at least one of seeds, chemical and fertilizer.

14. The planter assembly as claimed in claim 9, wherein said at least one sensor determines the height of said toolbar above the ground, and wherein said control system is configured to receive signals from said sensor to vary the weight transfer from said component to and from said toolbar to maintain a given height above the ground.

15. The planter assembly as claimed in claim 9, wherein said at least one sensor determines the weight transfer to said toolbar, and wherein said control system is configured to receive signals from said sensor to vary the weight transfer from said component to and from said toolbar to maintain a given height above the ground.

16. A method of weight transfer in a farm implement having a toolbar supporting a plurality of ground engaging tools and having a component of said implement, said method comprising the steps of:
 mounting said component on a ground support that is connected to said toolbar through a linkage such that the component is configured to be elevated or lowered relative to the toolbar;
 determining at least one parameter characterized by at least one of a force on said toolbar, a distance of said toolbar from the ground, and a weight transfer to said toolbar, wherein said parameter is defined from at least one sensor output; and,
 elevating or lowering said component relative to the toolbar to transfer at least one of weight and force between said toolbar and said component responsive to said at least one parameter.

* * * * *